US006960248B2

(12) United States Patent
Pavlin

(10) Patent No.: US 6,960,248 B2
(45) Date of Patent: Nov. 1, 2005

(54) CYCLIC BISAMIDES USEFUL IN FORMULATING INKS FOR PHASE-CHANGE PRINTING

(75) Inventor: Mark S. Pavlin, Savannah, GA (US)

(73) Assignee: Arizona Chemical Company, Jacksonville, FL (US)

( * ) Notice: Subject to any disclaimer, the term of this patent is extended or adjusted under 35 U.S.C. 154(b) by 81 days.

(21) Appl. No.: 10/444,410

(22) Filed: May 22, 2003

(65) Prior Publication Data

US 2004/0231555 A1 Nov. 25, 2004

(51) Int. Cl.$^7$ .............................................. C09D 11/00
(52) U.S. Cl. .............................. 106/31.43; 106/31.75; 106/31.29; 106/31.6
(58) Field of Search .......................... 106/31.43, 31.75, 106/31.29, 31.6

(56) References Cited

U.S. PATENT DOCUMENTS

| | | |
|---|---|---|
| 2,971,914 A | 2/1961 | Shoemaker ................ 252/51.5 |
| 3,653,932 A | 4/1972 | Berry et al. |
| 4,390,369 A | 6/1983 | Merritt et al. |
| 4,659,383 A | 4/1987 | Lin et al. |
| 4,816,549 A | 3/1989 | Rumack |
| 4,820,346 A | 4/1989 | Nowak |
| 4,830,671 A | 5/1989 | Frihart et al. |
| 5,006,170 A | 4/1991 | Schwarz et al. |
| 5,122,187 A | 6/1992 | Schwarz et al. |
| 5,151,120 A | 9/1992 | You et al. |
| 5,185,035 A | 2/1993 | Brown et al. ............. 106/31 R |
| 5,286,288 A | 2/1994 | Tobias et al. |
| 5,354,368 A | 10/1994 | Larson, Jr. |
| 5,421,868 A | 6/1995 | Ayalia-Esquilin et al. 106/20 R |
| 5,429,816 A | 7/1995 | Hofrichter et al. ............. 424/66 |
| 5,594,865 A | 1/1997 | Saitoh |
| 5,597,856 A | 1/1997 | Yu et al. ...................... 524/227 |
| 5,667,568 A | 9/1997 | Sacripante et al. ....... 106/20 R |
| 5,700,313 A | 12/1997 | Larson, Jr. ................. 106/22 A |
| 5,703,145 A | 12/1997 | Sagawa et al. ............. 523/161 |
| 5,902,840 A | 5/1999 | Singh et al. |
| 5,954,865 A | 9/1999 | Sawada .................... 106/31.29 |
| 6,037,396 A | 3/2000 | Sawada ...................... 524/231 |
| 6,071,986 A | 6/2000 | Everhardus et al. ........ 523/160 |
| 6,074,710 A | 6/2000 | Kato et al. ................... 428/1.5 |
| 6,231,654 B1 | 5/2001 | Elwakil .................... 106/31.47 |
| 6,280,510 B1 | 8/2001 | Kelderman et al. ...... 106/31.29 |
| 6,350,795 B1 | 2/2002 | Breton et al. ............... 523/160 |
| 6,372,235 B1 | 4/2002 | Livoreil et al. ............. 424/401 |
| 6,471,758 B1 | 10/2002 | Kelderman et al. ...... 106/31.29 |
| 2002/0150602 A1 | 10/2002 | Livoreil et al. ............. 424/401 |
| 2003/0129211 A9 | 7/2003 | Livoreil et al. ............. 424/401 |

FOREIGN PATENT DOCUMENTS

| | | |
|---|---|---|
| DE | 2551483 | 5/1977 |
| EP | 0307933 | 3/1989 |
| EP | 1177784 A2 | 2/2002 |
| FR | 2796276 A1 | 1/2001 |
| FR | 2811552 A1 | 1/2002 |
| JP | 57-119951 A | 7/1982 |
| JP | 58-187392 A | 11/1983 |
| JP | 8-48965 A | 2/1996 |
| WO | WO 94/14902 | 7/1994 |
| WO | WO 00/61080 | 10/2000 |
| WO | WO-01/87847 | 11/2001 |
| WO | WO 02/55030 | 7/2002 |

OTHER PUBLICATIONS

Patent Abstracts of Japan vol. 1996, No. 06, Jun. 28, 1996 & JP 8 048965 A (Nisshin Oil Mills Ltd:The), Feb. 20, 1996.
Chemical Abstracts abstract, "Polyamide compositions," Accession No. 1983:55064, 1983. See also JP–57–119951.
Chemical Abstracts abstract, "Thermal recording materials," Accession No. 1984:165503, 1984. See also JP 58–187392.
Derwent World Patent Index abstract, "Hypolipemic carboxylic–amides—such a N–isovaleryl N,N'–bis–(10–undecenoyl) ethylene–diamine," Accession No. 1976–79350X, 1976. See also DT 2551483.
Derwent World Patent Index abstract, "Gelling or solidifying agent for coating materials and medicines—comprises organic liquid comprising mono– and/or di–amide derivative of diamino–cyclohexane . . . ,"Accession No. 1996–167401, 1996. See also JP 8–48965.
Hanabusa, K. et al., "Prominent Gelation and Chiral Aggregation of Alkylamides Derived from *trans*–1,2–Diaminocyclohexane," *Angew. Chem. Int. Ed. Engl.* 35(17): 1949–1951, 1996.
Kato, T., et al., "Gelation of Room–Temperature Liquid Crystals by the Association of a *trans*–1,2–Bis(amino)cyclohexane Derivative," *Advanced Materials* 10(8): 606–608, 1998.

*Primary Examiner*—J. A. Lorengo
*Assistant Examiner*—Veronica F. Faison
(74) *Attorney, Agent, or Firm*—Thomas W. Barnes, III

(57) ABSTRACT

Cyclic bisamides may be used to formulate inks for jet ink printing. The cyclic bisamide may be prepared from a cyclic diamine and acylic monocarboxylic acids. Conversely, the cyclic bisamide may be prepared from a cyclic diacid and acylic monoamines. The performance properties of the product may be enhanced by adding some additional difunctional reactant(s), e.g., diacid or diamine. A blend of bisamides may provide better performance properties than either of the component bisamides alone, where the blend includes at least one cyclic bisamide. The bisamides, in combination with an image-forming material, and optionally in combination with other materials, is taken to a molten form and then applied to a substrate to provide a printed substrate.

13 Claims, No Drawings

CYCLIC BISAMIDES USEFUL IN FORMULATING INKS FOR PHASE-CHANGE PRINTING

TECHNICAL FIELD OF THE INVENTION

The present invention relates to phase-change inks and cyclic bisamide components thereof, as well as methods for printing with these inks.

BACKGROUND OF THE INVENTION

Hot-melt inks, also known as phase-change inks, are characterized by being solid at room temperature and molten at an elevated temperature at which the hot-melt ink is delivered to a substrate. Hot-melt inks are widely used in thermal transfer, rapid prototyping and ink jet printing, and have also been suggested for use in flexographic, intaglio and gravure printing.

Ink jet printing is a well-known process for the non-contact printing of substrates such as paper, plastic films, metal foils and the like. In essence, ink jet printing ejects a stream of liquid ink through a very small orifice, and thereafter, at a certain distance from the orifice known as the breakup distance, the stream separates into minute uniformly-sized droplets. The ink droplets travel through the air until they hit a substrate, whereupon the ink forms an image on the substrate.

Various technologies have been developed to direct jet ink in an image-wise fashion from the printhead of a printing device to a substrate. In one technology, called drop-on-demand, the printhead passes over a substrate and ejects droplets of ink only when and where ink is desirably deposited on the substrate. Drop-on-demand technology is commonly employed in desktop ink jet printers.

In contrast, in a process known as continuous stream jet printing, the printhead is constantly ejecting ink droplets as it passes over a substrate, or as the substrate passes before the printhead. A guidance system is stationed between the printhead and the substrate, so ink droplets are directed either to a specific location on the substrate or to a recirculation gutter if the droplet being ejected should not be allowed to contact the substrate. A typical continuous stream ink jet printer employs inks that can be given an electric charge, and the guidance system is an electrostatic field that will interact with and direct the charged ink droplets to a desired location. Continuous stream jet ink printing is more commonly seen in industrial printing than in desktop printing.

Jet inks suitable for either drop-on-demand or continuous stream ink jet printing can be classified either as liquid jet inks or hot-melt (phase-change) jet inks. Either type of ink typically contains both colorant and carrier, where the carrier is a material that dissolves, suspends or otherwise disperses the colorant. A liquid jet ink is liquid at room temperature, and is typically at about room temperature while being stored in a printhead prior to being ejected. A simple liquid jet ink is composed of an aqueous carrier and a water-soluble dye as the colorant. After liquid jet ink contacts a substrate, the solvent typically evaporates or wicks away from the colorant, leaving the colorant visible at, and around, the site where the ink initially contacted the substrate.

In contrast, hot-melt jet ink is solid at room temperature, and is heated to a molten state prior to being ejected from an ink jet printhead. Upon contacting the substrate, which is typically at room temperature, the molten (i.e., liquid) hot-melt ink will cool and solidify, hence the origin of the term "phase-change" for these inks. A simple hot-melt ink is composed of wax as the carrier and a pigment or dye as the colorant. All, or nearly all, of the components of hot-melt ink remain at the site where the molten ink contacts the substrate, i.e., there is little or no wicking or evaporation of components in a hot-melt ink.

An ink composition useful in jet ink printing should have certain properties. It is highly desirable that the ink display a consistent breakup length, droplet viscosity, and at least in continuous stream jet printing, a constant droplet charge under the conditions employed during the jet ink printing process. To meet these requirements, the jet ink composition must have stable viscosity, stable resistance properties, and should not dry out (i.e., lose solvent or other volatile materials) upon aging.

A major problem with liquid jet inks arises because they contain substantial amounts of water and/or organic solvent, which evaporate upon standing so that these inks dry out and cake. This can cause blocking of the printhead orifice(s). A further problem is that loss of volatile solvent(s) causes the inks to increase in viscosity, which will cause substantial changes in the performance of the inks. Also, a porous substrate such as paper tends to cockle and/or distort when printed with high quantities of liquid jet ink. Furthermore, the organic solvents found in liquid jet ink can evaporate after contacting the substrate, and this may cause health problems for people located in the vicinity of the printing process.

Another problem associated with the presence of liquid solvents in liquid jet ink is that these solvents cause the colorant to bleed into the printed, typically porous substrate, with the consequence that the printing displays poor resolution. While specially coated porous substrates may overcome this problem, such special substrates are expensive and not generally necessary for other types of printing, e.g., reprographic printing, which work fine with "plain paper", ie., standard non-coated sheet. At least in an office setting, it is highly desirable that all printing, including ink jet printing, be done on "plain paper" or standard transparencies.

Hot-melt inks offer a number of advantages over liquid inks. For example, when liquid ink is used to deposit colorant on a porous substrate, the colorant tends to be carried into the substrate as the liquid carrier wicks into the substrate. This causes a reduction in print density and some loss in print resolution. In contrast, the rapid solidification of hot-melt ink ensures that the colorant is fixed to the surface of the substrate, with a corresponding increase in print density and resolution. A further advantage is that there is little or no cockle associated with the printing of hot-melt inks, which is in distinct contrast to printing done with liquid inks. Still another advantage is that hot-melt inks are easier to transport without spillage than liquid inks.

For several reasons, the adhesion of colorant to a substrate may also be superior in hot-melt printing. For instance, because all of the carrier in a hot-melt ink stays with the colorant at the surface of the printed substrate, rather than evaporating or wicking away from the colorant as occurs in printing with liquid inks, a hot-melt carrier is better available to assist in fixing the colorant to the substrate's surface. Also, carriers that are solid at room temperature will naturally have better fixing properties than liquid carriers. Looking specifically at jet ink printing, hot-melt inks offer the advantage of having essentially no volatile components.

Thus, there is no evaporation of components in a hot-melt ink, and so no corresponding problems with changes in ink viscosity, caking and health risks due to solvent evaporation.

To a significant extent, the properties of the carrier determine the properties of hot-melt ink. The prior art discloses several materials that may be used as a carrier, sometimes also referred to as vehicle, binder or solid organic solvent, in hot-melt jet inks. As mentioned above, the principle component of most of these inks is, conventionally, a wax. Waxes as a class are substances having the physical properties associated with paraffin, the principal ingredient in ordinary candles and crayons. Typically waxes are hard, brittle, lubricious and opaque and possess a sharp melting point and a very low viscosity when measured at a temperature just above the melting point. All of these characteristics are associated with the crystalline nature of the wax. Waxes are usually either single compounds or mixtures of similar compounds that are saturated and linear. Examples of waxes are stearic acid and 12-hydroxystearic acid, as well as the esters and monoamides thereof.

Waxes are frequently used for the preparation of hot-melt inks because they have an unusual combination of properties in that they are hard solid substances with a low viscosity when melted. However, these waxes typically have poor adhesion to non-porous substrates because crystallization upon cooling causes them to shrink and so pull away from the substrate. Also, in many cases they are not good solvents for the high level of dye required to make a good image.

The following is a selected listing of U.S. patents that disclose phase change ink carriers. U.S. Pat. No. 3,653,932 discloses to use diesters of sebacic acid (a solid linear $C_{10}$ dicarboxylic acid) and paraffinic alcohols having 12 or fewer carbons. U.S. Pat. No. 4,390,369 discloses, e.g., to use natural wax. U.S. Pat. No. 4,659,383 discloses, e.g., to use $C_{20-24}$ acids or alcohols. U.S. Pat. No. 4,820,346 discloses, e.g., to use aromatic sulfonamides. U.S. Pat. No. 4,830,671 discloses, e.g., to use short-chain polyamides. U.S. Pat. No. 5,006,170 discloses, e.g., bisamide waxes from, e.g., ethylene diamine. U.S. Pat. No. 5,151,120 discloses, e.g., to use the ethyl ester of stearic acid (a solid linear, $C_{18}$ carboxylic acid). U.S. Pat. No. 5,421,868 discloses, e.g., solvent-containing inks that may contain a bisamide. U.S. Pat. No. 5,354,368 discloses, e.g., to use tall oil rosin. U.S. Pat. No. 5,597,856 discloses, e.g., tetramide in combination with amide-containing material. U.S. Pat. No. 5,667,568 discloses, e.g., fatty bisamides. U.S. Pat. No. 5,703,145 discloses, e.g., aromatic bisamides. U.S. Pat. No. 5,594,865 discloses, e.g., various amide-containing materials. U.S. Pat. No. 6,037,396 discloses, e.g., various amide-containing materials. The foregoing are exemplary of the prior art directed to hot-melt ink carriers.

Despite the significant amount of research that has been done in the area of carriers for hot-melt inks, there remains a need in the art for superior carrier materials useful in hot-melt inks, and for inks having such carrier materials. The present invention provides these and related advantages as described below.

SUMMARY OF THE INVENTION

In one aspect, the present invention is directed to hot melt jet ink compositions that comprise a cyclic bisamide of the formula

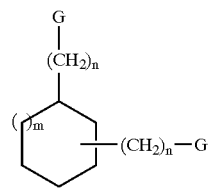

wherein n is 0 or an integer from 1 to 10, m is 0 or 1 so that the ring is a cyclopenty or cyclohexyl ring, respectively, and G is an amide-containing group optionally selected from —NH—C(O)—R, —C(O)—NH—R and —C(O)—NR$_2$ wherein R is a C1–C75 alkyl group. The term "C1–C75" means that the R group contains at least 1, and as many as about 75, carbons. In addition to the cyclic bisamide, the hot melt inks of the present invention include an image-forming component, e.g., a pigment or dye. The composition is preferably useful for phase change printing, and accordingly is preferably water-free, i.e., non-aqueous.

In another aspect, the present invention provides a composition prepared by the process of reacting, under amidification conditions, i.e., under reaction conditions that form amide bonds from amine and acid groups, reactants comprising a diamine of structure (IV)

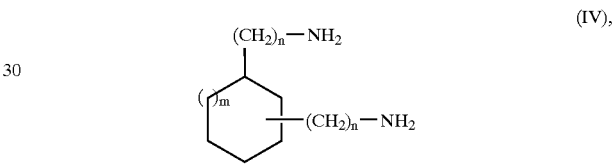

and a monocarboxylic acid of the formula $R^1$—COOH, wherein n is 0 or an integer from 1 to 10, m is 0 or 1 to provide a cyclopenty ring or cyclohexyl ring, and $R^1$ is a C1–C75 alkyl group. In this aspect of the invention, the reactants further comprising a difunctional reactant selected from (a) H$_2$N—$R^2$—NH$_2$ where $R^2$ is selected (i) from a polyether group having a plurality of O$R^3$ groups where $R^3$ is a C2–C10 aliphatic hydrocarbyl, and (ii) a C2–C36 hydrocarbyl group and (b) HOOC—$R^4$—COOH where $R^4$ is a C2–C34 hydrocarbyl group. This composition is preferably useful in formulation phase change inks, and accordingly preferably has a melt viscosity at 130° C. of less than 100 cPs. As another aspect, the present invention provides the amidification process of making the composition. The difunctional reactant is preferably a minor component of the reactants, or else the molecular weight of the composition will be too high to allow the composition to be useful in phase change inks, i.e., the melt viscosity and/or melting point will be too high. Accordingly, it is preferred that when the difunctional reactant comprises carboxylic acid groups, then the carboxylic acid groups from the difunctional reactant preferably constitute less than 25 equivalent percent of the total of the carboxylic acid groups present in the reactants. Conversely, when the difunctional reactant comprises amine groups, then the amine groups from the difunctional reactant preferably constitute less than 25 equivalent percent of the total of the amine groups present in the reactants. The difunctional reactant preferably contributes to the clarity and/or decrease in melting point of the composition.

In another aspect, the present invention provides a composition comprising a blend of first and second bisamides, wherein the first bisamide is described by structure (I)

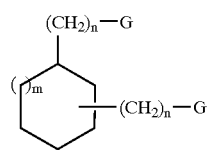

(I)

wherein n is 0 or an integer from 1 to 10, m is 0 or 1 to provide a cyclopenty ring or cyclohexyl ring, respectively, and G is an amide-containing group.

In other aspects, the present invention provides a method of printing wherein a hot melt ink comprising a cyclic bisamide is rendered in molten form, e.g., by melting off a thermal ink ribbon or conducted from a reservoir, and then ejected onto a substrate.

These and related aspects of the present invention are disclosed in further detail herein.

DETAILED DESCRIPTION OF THE INVENTION

The present invention provides compounds and compositions that are useful as ink components, as well as methods of making the compounds, compositions and inks, and methods of printing with the compounds, compositions and inks. The present invention recognizes that cyclic bisamides may be used to formulate inks for phase change printing. The cyclic bisamide may be prepared from a cyclic diamine and acylic monocarboxylic acids. Conversely, the cyclic bisamide may be prepared from a cyclic diacid and acylic monoamines. The performance properties of the product may be enhanced by adding some additional difunctional reactant(s), e.g., diacid or diamine. A blend of bisamides may provide better performance properties than either of the component bisamides alone, where the blend includes at least one cyclic bisamide. The bisamides, in combination with an image-forming material, and optionally in combination with other materials, may be taken to a molten form and the applied to a substrate to provide a printed substrate.

A. Cyclic Bisamides

In one aspect, the present invention provides hot melt ink compositions, and compositions that are useful in formulating hot melt inks, where the compositions comprise a cyclic bisamide of the formula (I)

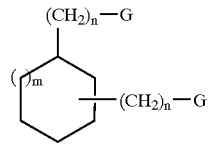

(I)

wherein n is 0 or an integer from 1 to 10, m is 0 or 1 so that the ring is a cyclopenty or cyclohexyl ring, respectively, and G is an amide-containing group, preferably selected from —NH—C(O)—R, —C(O)—NH—R and —C(O)—NR$_2$ wherein R is a C1–C75 alkyl group. In addition to the cyclic bisamide, the hot melt inks of the present invention include an image-forming component. Phase change printing entails heating solid ink until in reaches a molten form, then applying the molten ink to a substrate whereupon the ink cools and returns to a solid form. Accordingly, the ink composition that is heated preferably does not contain any volatile material, e.g., water or other material with a boiling point below the temperature at which the molten ink is held prior to be applied to the substrate. Thus, the composition is preferably non-volatile in that little or none of the composition evaporates while the composition is in a molten form. One non-volatile composition is non-aqueous.

In one embodiment, m is zero so that the bisamide includes a cyclopentyl ring and has the formula (II)

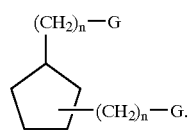

(II)

In another embodiment, m is one, so that the bisamides include a cyclohexyl ring and have the formula (III)

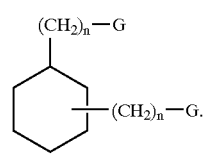

(III)

In compounds of formula (I), the group —(CH$_2$)$_n$-G is shown bisecting a bond of the cyclopenty or cyclohexyl ring. This representation is meant to indicate that the group —(CH$_2$)$_n$-G may be attached to any carbon of the ring not already directed bonded to a —(CH$_2$)$_n$-G group. Thus, in one embodiment, the bisamides are 1,2-disubstituted cyclopentanes, while in a separate embodiment the bisamides are a 1,3-disubstituted cyclopentane, as shown in structures (IIa) and (IIb), respectively.

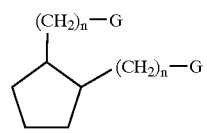

(IIa)

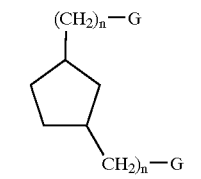

(IIb)

Likewise, the cyclohexyl ring may have the group —(CH$_2$)$_n$-G attached to any ring carbon not already directly bonded to a —(CH$_2$)$_n$-G group. Thus, in one embodiment the bisamide is a 1,2-disubstituted cyclohexyl bisamide as represented by structure (IIIa), and in a separate embodiment the bisamide is a 1,3-disubstituted cyclohexyl bisamide as represented by structure (IIIb), while in another separate embodiment the bisamide is a 1,3-disubstituted cyclohexyl bisamide represented by structure (IIIc).

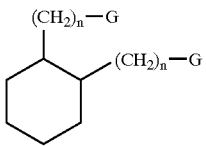

(IIIa)

-continued

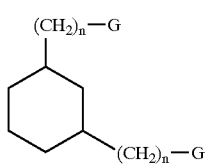

(IIIb)

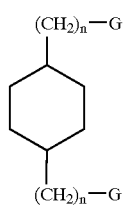

(IIIc)

In each of structures (I), (II), (IIa), (IIb), (III), (IIIa), (IIIb), and (IIIc), n may be zero or an integer selected from 1 to 10, inclusive. The present invention provides separate embodiments wherein, for each of these eight structures, n is 0 at both instances of n in each specific structure. In other separate embodiments, the present invention provides that for each of these eight structures, n is 0 for one of the —$(CH_2)_n$-G groups in a structure, and n is selected from 1 to 10 for the other —$(CH_2)_n$-G group in the structure. For example, the present invention provides embodiments wherein for each of these eight structures, n is 0 for one of the —$(CH_2)_n$-G groups in a structure, and n is 1 for the other —$(CH_2)_n$-G group in the structure.

For each of the structures (I), (II), (IIa), (IIb), (III), (IIIa), (IIIb), and (IIIc), and independent of whether n is 0 or 1–10 at each occurrence, the group denoted G comprises an amide functionality. Exemplary amide-containing groups include —NH—C(O)—R, —C(O)—NH—R and —C(O)—$NR_2$ wherein R is, independently at each occurrence, a C1–C75 alkyl group. In one embodiment, G is —NH—C(O)—R at each occurrence. In one embodiment, G is —NH—C(O)—R in at least one occurrence. In one embodiment, G is —C(O)—NH—R at each occurrence. In one embodiment, G is —C(O)—NH—R in at least one occurrence. In one embodiment, G is —C(O)—$NR_2$ at each occurrence. In one embodiment, G is —C(O)—$NR_2$ in at least one occurrence.

The term "C1–C75 alkyl group" refers to an alkyl group having at least 1 and as many as about 75 carbon atoms. As used herein, an "alkyl group" refers to a saturated or unsaturated, straight or branched, hydrocarbon chain. Independently, in various embodiments, the alkyl group has zero branches (i.e., is a straight chain or linear alkyl group), one branch, two branches, or more than two branches.

The present invention provides that each of the following criteria may be used to characterize the alkyl group, where each of these criteria apply to each of structures (I), (II), (IIa), (IIIb), (III), (IIIa), (IIIb), and (IIIc): R is C1–C30; R is C1–C25; R is C1–C20; R is C1–C15; R is C1–C10; R is C2–C35; R is C2–C30; R is C2–C25; R is C2–C20; R is C2–C15; R is C2–C10; R is C5–C35; R is C5–C30; R is C5–C25; R is C5–C20; R is C5–C15; R is C5–C10; R is C8–C35; R is C8–C30; R is C8–C25; R is C8–C20; R is C8–C15; R is C8–C10; R is C10–C35; R is C10–C30; R is C10–C25; R is C10–C20; R is C10–C15; R is C15–C35; R is C15–C30; R is C15–C25; R is C15–C20. For each of these ranges of numbers, in one embodiment the alkyl group is linear. For each of these ranges of numbers, in one embodiment the alkyl group has a single branch point. For each of these ranges of numbers, in one embodiment R is the same structure at each occurrence. For each of these ranges of numbers, in one embodiment R is a different structure at each occurrence.

The two —$(CH_2)_n$-G groups may be attached to the same face of the ring or to opposite faces. In other words, they may be in the relative "cis" configuration, or in the "trans" configuration. In one embodiment, the bisamide compound present in the compositions of the invention is a mixture of isomers, i.e., the cis and trans isomers are in admixture. In another embodiment the bisamide compound is not a mixture of isomers, i.e., cis is not in admixture with trans, and vice versa. In one embodiment, the cyclic bisamide has the cis configuration and is not in admixture with the trans configuration. In another embodiment the cyclic bisamide has the trans configuration and is not in admixture with the cis configuration.

B. Cyclic Bisamide Properties

In order to be useful in a hot-melt ink, a composition of the invention comprising cyclic bisamide should typically be a solid at room temperature and have a melting point below the operating temperature of the printing equipment that is used to apply the molten ink to a substrate. The cyclic bisamide preferably has a softening point above about 50° C., in order that it is not tacky, and is easily handled without loosing its shape. When the softening point of the cyclic bisamide (or a composition containing one or more of the cyclic bisamides) falls below about 50° C., the compound or composition may melt and/or become tacky when exposed to elevated temperatures as may be experienced during storage or transport. In various embodiments of the invention, the cyclic bisamide and/or a composition comprising the cyclic bisamide has a melting point of 50–175° C., or 60–175° C., or 70–175° C., or 80–175° C., or 90–175° C., or 100–175° C., or 50–150° C., or 70–150° C., or 80–150° C., or 90–150° C., or 100–150° C., or 50–130° C., or 70–130° C., or 80–130° C., or 90–130° C., or 100–130° C. The melting point can be measured by, e.g., the dropping point device sold by Mettler-Toledo International, Inc. (CH-8606 Greifensee, Switzerland; http://www.mt.com) as their Model FP83HT Dropping Point Cell. The melting point of the cyclic bisamide may be varied, in part, by varying the identities of the R group in the cyclic bisamide. The melting point of the composition may also be decreased by adding a minor amount of difunctional reactant, as discussed below.

The cyclic bisamide, and compositions comprising the cyclic bisamide, preferably have a melt viscosity of less than about 500 centipoise (cP or cPs) when measured at 130° C. in neat form. In general, most hot melt jet inks that enjoy commercial acceptance have a viscosity when measured at 130° C. of less than about 100 cPs, and many have a viscosity of less than about 50 cPs. Accordingly, a relatively low melt viscosity for the cyclic bisamide, and compositions comprising the cyclic bisamide, is generally preferred. In various embodiments of the invention, the cyclic bisamide, and compositions comprising the cyclic bisamide, has a melt viscosity, when measured at 130° C., of less than 500 cPs, or less than 400 cPs, or less than 300 cPs, or less than 200 cPs, or less than 100 cPs, or less than 90 cPs, or less than 80 cPs, or less than 70 cPs, or less than 60 cPs, or less than 50 cPs, or less than 40 cPs, or less than 30 cPs, or less than 20 cPs. Melt viscosity can be conveniently measured using the Model RVTD Digital Viscometer from Brookfield Engineering Laboratories (Middleboro, Mass.; http://www.brookfieldengineering.com). When the melt viscosity of the cyclic bisamide (or composition comprising the cyclic bisamide) is much above 75 cPs, then the ink into which the cyclic bisamide is added will typically need to contain a very low viscosity component, e.g., a polyether, in order to bring the viscosity of the ink to below about 50 cPs. The melt viscosity of the cyclic bisamide may be varied, in part, by varying the identities of the R group in the cyclic bisamide.

The "feel" and "hardness" of the cyclic bisamide are important parameters in order for the bisamide to be successfully incorporated into a hot-melt ink. The cyclic bisamide is preferably "hard" and "brittle" in that it resists being deformed by, e.g., a durometer and it resists being deformed under flexural stress. In addition, it preferably has a waxy feel, i.e., it has a low coefficient of friction. These properties are readily observed empirically, however, instrumentation may be utilized to measure fine distinctions in properties between two or more cyclic bisamides.

The cyclic bisamide preferably has an appearance ranging from translucent to transparent. Again, this property is readily observed empirically, however, instrumentation may be utilized to measure fine distinctions in appearance between two or more cyclic bisamides. In one aspect, the cyclic bisamide is crystal clear. However, black hot-melt inks, especially thermal transfer ribbon inks, are commercially desirable and so colored cyclic bisamides, e.g., amber or hazy bisamides, are also useful.

Phase-change inks are preferably non-tacky at room temperature or even slightly elevated temperatures as might be experienced when printed materials are transported in hot weather by truck or rail. Thus, the cyclic bisamide and/or the composition containing the cyclic bisamide is preferably non-tacky under the same conditions. Non-tacky cyclic bisamides can be prepared according to the invention disclosed herein.

C. Ink Compositions and Properties

Another aspect of the invention is a hot-melt ink composition comprising an image-forming component and a cyclic bisamide as described above. The image-forming component is a material that may be detected or observed by any means. A colorant is a preferred image-forming component, where colorants may be visually detected by the human eye, or by an optical character reading (OCR) device. Both dyes and pigments are suitable colorants, where extensive lists of specific dyes and pigments suitable for use in the hot-melt ink of the present invention are set forth in both of U.S. Pat. Nos. 5,286,288 and 5,122,187, where the disclosures of these two patents are incorporated herein in their entireties. Alternatively, the image-forming component may be a magnetic material that can be scanned by a suitable reader, or a fluorescent material that can be detected upon exposure to specific wavelengths of light.

The bisamide typically constitutes about 0.5 to about 97 weight percent of the hot-melt ink composition, and preferably about 80–97 weight percent of the ink composition. The image-forming component typically constitutes about 0.1–3 weight percent, preferably about 0.3–2 weight percent of the hot-melt ink composition. In various aspects, the cyclic bisamide of formula (I) constitutes at least 10 wt %, or at least 20 wt %. or at least 30 wt %, or at least 40 wt %, or at least 50 wt %, or at least 60 wt %, or at least 70 wt %, or at least 80 wt % of the total weight of the composition.

The cyclic bisamide may constitute all or a part of the non-colorant components of the ink. When cyclic bisamide is only a portion of the non-colorant components of the ink, the other components are selected depending on the particular features desired in the final ink and printed substrate. For example, when the hot-melt ink is used in continuous jet ink printing, the ink may contain an electrolyte. When containing an electrolyte, the hot-melt ink may be induced to carry a charge, and droplets of charged hot-melt ink may be directed to either a substrate for printing, or a gutter for recycling, by adjustment of an electrostatic field through which the charged ink particles must pass. A suitable electrolyte for the hot-melt ink composition of the invention is an inorganic salt, as disclosed in, e.g., U.S. Pat. No. 5,286,288. When the electrolyte is an inorganic salt, an electrolyte-solvating and dissociating compound, as also disclosed in the '288 patent, is preferably present in the hot-melt ink composition.

Other ingredients that may be present in the hot-melt ink composition of the invention include one or more of a hydrocarbon, ester, or amide wax, corrosion inhibitor, biocide, plasticizer, tackifier, surfactant, dispersing agent, antioxidant, rheology modifier and UV stabilizer. As mentioned previously, a volatile solvent, e.g., a solvent having a boiling point of less than 150° C., is preferably not present in the phase-change ink.

In one aspect, the present invention provides a composition comprising a monoamide in combination with the cyclic bisamides described herein. The combination of monoamide and cyclic bisamide can provide a composition having a lower melt viscosity (i.e., a lower viscosity at a particular temperature at which the composition is molten) than the cyclic bisamide alone. Lower viscosity is generally desirable because it may allow, for instance, a greater loading of cyclic bisamide in the composition. Also, in some instances, lower viscosity facilitates ejection of the composition from a printhead.

Exemplary monoamides include, without limitation, compounds of the formula $R^1$—CO—NH—$R^2$, where each of $R^1$ and $R^2$ is a hydrocarbon having about 10–30 carbons. The carboxylic acids described below may, for instance, be reacted with amines to form monoamides. Exemplary monoamides include stearylstearamide, octadecanamide, behenyl benenamide and products made under the KEMAMIDE trademark by Witco Chemical Company. The monoamide may alternatively be a hydroxy-functional monoamide as described in, e.g., U.S. Pat. No. 5,902,84. Typically, the weight ratio of bisamide to monoamide will be in the range of 10:1 to 1:10, where an optimum value may be readily determined by one of ordinary skill in the art based on the desired objective in terms of melting point and melt viscosity, as well as other relevant factors.

Phase-change inks are preferably non-tacky at room temperature or even slightly elevated temperatures as might be experienced when printed materials are transported in hot weather by truck or rail. When a jet ink of the present invention is used in jet ink printing with conventional printing equipment, the ink typically has a melting point of about 40° C. to about 150° C., preferably about 60° C. to about 140° C., and more preferably about 80° C to about 130° C. The melting point of the ink can be measured by, e g., the dropping point device sold by Mettler-Toledo International, Inc. (CH-8606 Greifensee, Switzerland; http://www.mt.com) as their Model FP83HT Dropping Point Cell.

D. Preparation of Cyclic Bisamides

The cyclic bisamides may be prepared by reacting together reactants. Since the cyclic bisamides contain two amide groups, a convenient way of forming the bisamides is to react amines with carboxylic acids. For example, when G in each instance is —NH—C(O)—R, the cyclic bisamide may be prepared by reacting a cyclic diamine of the structure (IV)

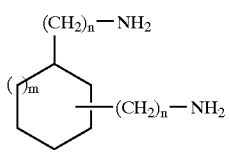

with carboxylic acid of the structure R—COOH. Alternatively, when G in each instance is —C(O)—NH—R or —C(O)—NR$_2$, the cyclic bisamide may be prepared by reacting a cyclic diacid of the structure (V)

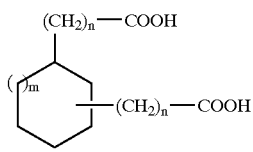

with monoamine of the structure R—NH$_2$ or R—NH—R.

The monocarboxylic acid of the formula R—COOH (also referred to herein as R$^1$—COOH) contains 1 to about 75 carbons. In one embodiment the R group is saturated, i.e., it does not contain any double or triple bonds. As mentioned previously, R (or R$^1$) is, in various embodiments, C1–C30; C1–C25; C1–C20; C1–C15; C1–C10; C2–C35; C2–C30; C2–C25; C2–C20; C2–C15; C2–C10; C5–C35; C5–C30; C5–C25; C5–C20; C5–C15; C5–C10; C8–C35; C8–C35; C8–C20; C8–C15; C8–C10; C10–C35; C10–C30; C10–C25; C10–C20; C10–C15; C15–C35; C15–C30; C15–C25; or C15–C20.

Exemplary monocarboxylic acids of the formula R—COOH (and R$^1$—COOH) include, without limitation, stearic acid (C$_{18}$), 1-eicosanoic acid (C$_{20}$), 1-docosanoic acid (C$_{22}$, also known as behenic acid), dotriacontanoic acid (C$_{32}$), tetratriacontanoic acid (C$_{34}$), pentatriacontanoic acid (C$_{35}$), tetracontanoic acid (C$_{40}$), tetraacontanoioc acid (C$_{44}$), dopentaacontanoic acid (C$_{54}$), tetrahexaacontanoic acid (C$_{64}$), dohexaacontanoic acid (C$_{72}$), etc. These monocarboxylic acids are available from many commercial suppliers, including Aldrich Chemical (Milwaukee, Wis.; www.sigma-aldrich.com).

Another suitable monocarboxylic acid is the oxidized (specifically, carboxyl terminated) polyethylene materials sold by Baker-Petrolite (Sugar Land, Tex.; www.bakerhughes.com/bapt/; division of Baker Hughes; www.bakerhughes.com) as their UNICID™ acids. UNICID™ acids are fully saturated, linear carboxylic acids with average carbon chain lengths ranging from C24 to C50. Acid values for UNICID™ acids vary from 60 to 115.

Still another suitable monocarboxylic acid is the alpha-branched carboxylic acids prepared by oxidizing higher molecular weight Guerbet alcohols. Such products are available from Jarchem Industries Inc. (Newark, N.J.; www.jarchem.com) as their JARIC™ acids. JARIC™ I-36 acid is a suitable monocarboxylic acid for the present invention.

Small amounts of so-called co-acid, i.e., monocarboxylic acid not falling meeting the criteria of R—COOH, may be used to prepare the cyclic bisamide. For example, the co-acid may have an aromatic ring. In the context of co-acid, "small amounts" means less than 50% of the monocarboxylic acid equivalents used to prepare the cyclic bisamide are contributed by the co-acid, and preferably less than 30%, less than 20%, less than 10%, less than 5%, and essentially no co-acid is used. Thus, monocarboxylic acid R—COOH preferably provides the majority of the monocarboxylic acid reactant used in the preparation of a cyclic bisamide, and preferably contributes at least 70%, or at least 80%, or at least 90%, or at least 95%, or essentially all of the monocarboxylic acid reactants, based on the equivalents of carboxylic acid present due to carboxylic acid-containing molecules among the reactants.

The following are exemplary diamines of formula (IV) wherein m is 1: 1,2-diaminocyclohexane; 1,3-diaminocyclohexane; 1,4-diaminocyclohexane; 1-amino-2-methylaminocyclohexane; 1-amino-3-methylaminocyclohexane; 1-amino-4-methylaminocyclohexane; 1-amino-2-ethylaminocyclohexane; 1-amino-3-ethylaminocyclopentane; 1-amino-4-ethylaminocyclohexane.

For example, the diamine may be 1,2-diaminocyclohexane (DACH) of the structure

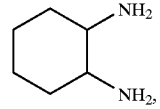

where this material is commercially available from, e.g., Aldrich, Milwaukee, Wis., USA. In one aspect of the invention, a bisamide-containing composition is prepared by reacting DACH with monocarboxylic acid to provide a composition having an acid value of 1 to 20, and amine value of 1 to 20, preferably 1–10 and 1–10, respectively. The composition preferably has a melting point of 100–150° C. and a melt viscosity at 140° C. of 5–25 cPs.

The following are exemplary diamines of formula (IV) wherein m is 0: 1,2-diaminocyclpentane; 1,3-diaminocyclopentane; 1-amino-2-methylaminocyclopentane; 1-amino-3-methylaminocyclopentane; 1-amino-2-ethylaminocyclopentane; 1-amino-3-ethylaminocyclopentane.

For example, the diamine may be 1-amino-2-methylamino-cyclopentane of the structure:

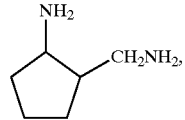

where this material is also known as AMCPA (aminomethyl cyclopentylamine) and is available from, e.g., Du Pont De Nemours, Wilmington, Del., USA. In one aspect of the invention, a bisamide-containing composition is prepared by reacting AMCPA with monocarboxylic acid to provide a composition having an acid value of 1 to 20, and amine value of 1 to 20, preferably 1–10 and 1–10, respectively. The composition preferably has a melting point of 100–150° C. and a melt viscosity at 140° C. of 5–25 cPs. In various aspects, the monocarboxylic acid is a C1–C100 acid, or a C5–C50 acid, or a C10–C30 acid, or a C10–C26 acid, or a C12–C24 acid. Thus, the present invention provides the bisamide prepared from AMCPA and, in various aspects, these monocarboxylic acids.

The following are exemplary diacids of formula (V) wherein m is 1: 1,2-dicarboxycyclohexane; 1,3-dicarboxycyclohexane; 1,4-dicarboxyycyclohexane; 1-amino-2-methylcarboxycyclohexane; 1-amino-3- methylcarboxycyclohexane; 1-amino-4-methylcarboxycyclohexane; 1-amino-2-ethylcarboxycyclohexane; 1-amino-3-ethylcarboxycyclohexane; 1-amino-4-ethylcarboxycyclohexane.

For example, the cyclic diacid may be 1,4-cyclohexane dicarboxylic acid having the formula

1,4–Cyclohexane dicarboxylic acid may be in either the cis

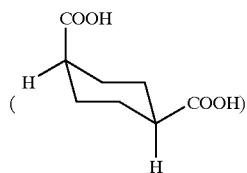

or trans

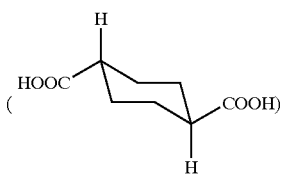

isomeric form. Either isomer, or any mixture of these isomers, may be used in the preparation of a polyamide of the present invention. For example, Eastman (Kingsport, Tenn.; www.eastman.com) sells EASTMAN 1,4–CHDA-HP™ high purity 1,4-cyclohexanedicarboxylic acid, which is a white powder having a melting point of 165° C. and a cis isomer content of 80 wt. % (based on total weight of cis and trans diacid), that may be used to provide 1,4-cyclohexane dicarboxylic acid to the present reaction. 1,4-cyclohexane dicarboxylic acid is also available in various grades and purities from Aldrich (Milwaukee, Wis.). The cisoid stereoisomer of 1,4-cyclohexanedicarboxylic acid generally provides for a polymer of the invention having a harder consistency in comparison to the polymer formed from the transoid 1,4-cyclohexanedicarboxylic stereoisomer.

The following are exemplary diacids of formula (V) wherein m is 0: 1,2-dicarboxycyclopentane; 1,3-dicarboxycyclopentane; 1-amino-2-methylcarboxycyclopentane; 1-amino-3-methylcarboxycyclopentane; 1-amino-2-ehtylcarboxycyclopentane; 1-amino-3-ethylcarboxycyclopentane.

Reactive equivalents of acids/diacids and amines/diamines may be used to prepare the cyclic bisamide. For example, diesters may be substituted for some or all of the diacid, where "diesters" refer to the esterification product of diacid with hydroxyl-containing molecules. However, such diesters are preferably prepared from relatively volatile hydroxyl-containing molecules, in order that the hydroxyl-containing molecule may be easily removed from the reaction vessel subsequent to diamine reacting with the diester. A lower alkyl diester, e.g., the esterification or diesterification product of diacid as defined herein and a $C_{1-4}$ monohydric alcohol (e.g., methanol, ethanol, propanol and butanol), may be used in place of some or all of the diacid in the cyclic bisamide-forming reaction. The acid halide of the diacid may likewise be employed in place of some or all of the diacid, however such a material is typically much more expensive and difficult to handle compared to the diacid itself, and thus the diacid is preferred. While such reactive equivalents may be employed in the reaction, their presence is not preferred because such equivalents introduce undesired reactive groups into the reaction vessel.

As described herein, in one aspect carboxylic acids are reacted with amines to prepare the cyclic bisamide. These starting materials are preferably reacted together with a stoichiometry, and under reaction conditions, such that the acid number of the resulting reaction product is less than 25, preferably less than 20, preferably less than 15, and more preferably less than 10, or less than 5, and still more preferably less than 1, while the amine number is likewise preferably less than 25, preferably less than 20, preferably less than 15, preferably less than 10, more preferably less than 5, and still more preferably less than 1. In one aspect, a composition comprising the cyclic bisamide is prepared having an acid number between 0.1 and 10, and an amine number between 0.1 and 10. In another aspect, a composition comprising the cyclic bisamide is prepared having an acid number between 1 and 25, and an amine number of between 1 and 25. The progress of the reaction may be monitored by periodically withdrawing samples and measuring the acid number of the samples. Techniques to measure an acid number are well known in the art. See, e.g., ASTM D-465 (1982). Typically, a 4–8 hour reaction time at about 200–220° C. can provide a cyclic bisamide meeting a specified acid and amine number.

To prepare a cyclic bisamide, the acid(s) and amine(s) are reacted together under amidification conditions. As used herein, "reacted together" means to combine the reactants to form a reaction mixture. Amidification conditions refer to maintaining this mixture at an elevated temperature to achieve bisamide formation. Any order of reactant combination is suitable, and heating rate is not particularly important. The final heating temperature is suitably about 150° C. to about 250° C. At temperatures below about 150° C., the rate of product formation is undesirably slow, while temperatures above about 250° C. can cause some reactant and/or product degradation, resulting in dark colored product.

Upon heating, water vapor will be evolved as the amidification reaction occurs. Preferably, the water vapor is condensed and removed from the reaction mixture as soon as it forms, thus driving the reaction to completion. A gentle flow of an inert gas, nitrogen for example, may be passed through the reaction flask in order to facilitate removal of the water vapor. Alternatively, the water vapor is removed by application of a modest vacuum of about 20–200 mtorr, or by co-distillation of an inert process solvent (e.g., co-distillation of xylene) with use of a Dean Stark trap.

A catalyst may be used to speed up the amidification reaction, where suitable catalysts are well known in the art and include sulfuric acid, phosphoric acid and other inorganic acids, metal hydroxides and alkoxides such as tin oxide and titanium isopropoxide, and divalent metal salts such as tin or zinc salts. When a catalyst is present, it should be used in small amounts, e.g., less than about 5 weight percent of the total mass of the reaction mixture, preferably less than about 2% and more preferably less than about 1% of the total mass of the reaction mixture. Excessive amounts of catalyst increase the cost of preparing the cyclic bisamide, as well as often leave behind residue that may be harmful to the environment in which hot-melt ink is placed, e.g., a printhead.

Thus, the present invention provides a composition prepared by a process that includes the step of reacting together various reactants to provide a reaction mixture, where those reactants include monocarboxylic acid or reactive equivalent thereof and cyclic diamine reactive equivalent thereof. The relative amounts of the reactants, and the duration of the reaction period, are preferably selected to provide a resulting composition having an acid number and an amine number of less than 25. In order to be used in printing, the composition should be placed in admixture with an image-forming component as discussed above.

It is important to control the stoichiometry of the reactants in order to prepare cyclic bisamide according to the present invention. In the following discussion regarding reactant stoichiometry, the terms "equivalent(s)" and "equivalent percent" will be used, and are intended to have their standard meanings as employed in the art. However, for additional clarity, it is noted that equivalents refer to the number of reactive groups present in a molar quantity of a molecule, such that a mole of a dicarboxylic acid has two equivalents of carboxylic acid, while a mole of diamine has two equivalents of amine. Furthermore, it is emphasized that a "diacid" has only two reactive groups (both carboxylic acids), a monocarboxylic acid has only one reactive group (a carboxyl group), a "diamine" has two reactive groups (both primary amine groups), and a monoamine has one reactive group (an amine group, which may be primary or secondary), and these are preferably, although not necessarily, the only reactive materials present in the reaction mixture.

According to the invention, is it preferred that the equivalents of carboxylic acid (from acid or diacid) are substantially equal to the equivalents of amine (from amine or diamine). Under these conditions, substantially all of the carboxylic acid groups will react with substantially all of the amine groups, so that the final product contains very little unreacted carboxylic acid, or amine groups. In other words, each of the acid and amine numbers of a composition containing a plurality of compounds of the invention is preferably less than about 25, is more preferably less than about 15, and is more preferably less than about 10, and is still more preferably less than about 5.

A preferred cyclic bisamide is at least partially transparent, and thus does not interfere with, taint or mask the appearance of the colorant or other image-forming component in the ink. Furthermore, preferred cyclic bisamides are hard, are not oily, and are non-tacky.

E. Blends Including Cyclic Bisamides and the Preparation Thereof

In one aspect of the invention, the cyclic bisamide is in admixture with a second bisamide, where the second bisamide may or may not be a cyclic bisamide of structure (I). Such compositions will be referred to herein as blends.

In order to prepare such a blend, the component bisamides may be individually prepared and then mixed together. A second bisamide that is not defined by structure (I) may be prepared by methods analogous to the methods described herein for preparing cyclic bisamides of structure (I). Basically, the appropriate acid and amine reactants are combined and heated until the desired condensation reaction, in this case an amidification reaction, occurs so as to form a component bisamide. In order to prepare the blend, the component bisamides are heated while in admixture to achieve a molten state, whereupon they may be stirred so as to form a homogeneous mixture. Upon cooling, the homogeneous mixture forms the blend of the present invention. This method of forming the blend is another aspect of the present invention.

Alternatively, a component bisamide may be prepared and placed into a molten state. To the molten bisamide, which may be either the cyclic bisamide of formula (I) or the second bisamide of the blend, is added the reactants needed to form the other component bisamide of the blend. After formation of the "other component bisamide", cooling of the mixture forms the blend of the present invention. This method of forming a blend is another aspect of the present invention.

As another alternative, all of the reactants may be charged to a reaction vessel, and then those reactants are brought to an elevated temperature sufficient to cause amidification reactions occur. Upon cooling, a blend of the present invention is formed. This method of forming a blend is another aspect of the present invention.

In one aspect of the invention, two different cyclic bisamides as defined herein, i.e., two different bisamides of structure (I), are present in the blend. For example, a cyclic bisamide of structure (II) and a bisamide of structure (III) may be present in the blend. As another example, two different cyclic bisamides of structure (II) may be present in the blend. As a further example, two different cyclic bisamides of structure (III) may be present in the blend. Each of these three examples is a separate aspect of the present invention.

For each of these three aspects, in one embodiment of the invention G, in each occurrence, is —NH—C(O)—R. The preparation of a blend meeting this criteria is conveniently accomplished by employing two different diamines. In one aspect of the invention, two different diamines are used to prepare the blend, where at least one diamine is described by structure (IV). For example, both diamines may be described by structure (IV). However, in a separate embodiment, one of the diamines is a cyclic diamine described by structure (IV) and another diamine may or may not be cyclic, however, it is not described by structure (IV). This diamine that is not described by structure (IV) may be referred to as a co-diamine.

Exemplary co-diamines include the following, where separate aspects of the invention provide that each of the listed exemplary co-diamines is used to prepare a blend of the present invention: a short-chain diamine, i.e., a diamine wherein the two amine groups are attached to an aliphatic, cycloaliphatic, or aromatic moiety containing no more than 6 carbon atoms, and "aliphatic" refers to a molecular moiety having a structure devoid of aromatic ring systems, "cycloaliphatic" refers to an aliphatic molecular moiety having a ring structure, and "aromatic" refers to a molecular moiety containing an aromatic ring structure such as, without limitation, phenyl or naphthyl; a branched-chain aliphatic diamine, i.e., a diamine wherein the two amine groups are separated by a saturated non-cyclic hydrocarbyl group that comprises at least one secondary or tertiary carbon; ethylenediamine (EDA); 1,2-diaminopropane; 1,3-diaminopropane; 1,2-diaminebutane; 1,4-diaminobutane; 1,2-diamino-2-methylpropane; 1,3-diaminopentane; 1,5-diaminopentane; 2,2-dimethyl-1,3-propanediamine; 1,6-hexanediamine (also known as hexamethylenediamine, HMDA); 2,2,4-trimethylhexanediamine; 3-ethyl-2-propyl-1,5-pentanediamine; 2-methyl-1,5-pentanediamine; 1,7-diaminoheptane; 1,8-diaminooctane; 2,5-dimethyl-2,5-hexanediamine; 1,9-diaminononane; 1,10-diaminodecane; 1,12-diaminododecane; diaminophenanthrene (all isomers, including 9,10); piperazine; 2-methypiperazine; 2,7-diaminofluorene; phenylene diamine (1,2; 1,3 and/or 1,4 isomers); 4–4'-diaminodiphenylmethane; adamantane diamine; isophorone diamine (a.k.a. 3-methyl-3- aminoethyl-5-dimethyl-1-aminocyclohexane); m-xylene diamine; tolylene diamine; xylylene diamine; 2,4,6-trimethyl-1,3-phenylenediamine; menthane diamine (i.e., 1,8-diamino-p-menthane); 2,3,5,6-tetramethyl-1,4-phenylenediamine; polyether diamine; dimer diamine; diaminonaphthalene (any of the isomers, including 1,5; 1,8; and 2,3); 4-amino-2,2,6,6-tetramethylpiperidine; and diamines of the formula $H_2N$—$R^a$—$NH_2$ wherein $R^a$ is a $C_{2-6}$ hydrocarbon diradical.

As mentioned previously, the diamine may be a polyetherdiamine, also referred to herein as a PAO (for polyalkyleneoxy) diamine. Polyetherdiamines may be obtained from Tomah Products, Inc., Milton, Wis., and Huntsman Chemical. A suitable polyetherdiamine is a poly(propyleneoxy)diamine having the formula $H_2N$—$C(CH_3)$ $HCH_2O$—$(CH_2C(R)HO)_n$—$CH_2C(CH_3)H$—$NH_2$, such as JEFFAMINE® 230 diamine (n is 1–2, and R is $CH_3$), JEFFAMINE™ D-400 diamine (n is 4–5 and R is $CH_3$), JEFFAMINE® D-2000 diamine (n is ca. 32 and R is $CH_3$), and XTJ-502 diamine (formerly JEFFAMINE® ED-2003 diamine, n is ca. 41 and R is H), where each of these polyetherdiamines is commercially available from Huntsman Corporation (Salt Lake City, Utah, USA, @huntsman.com). Another suitable diamine is a poly(ethyleneoxy)-co-propyleneoxy) diamine such as HUNTSMAN XTJ-500. Another suitable diamine is DPA-DEG, having CAS Registry No. 271-79-0 and the chemical structure $H_2N$—$CH_2CH_2CH_2$—O—$CH_2CH_2$—O—$CH_2CH_2$—O—$CH_2CH_2CH_2$—$NH_2$. Yet another suitable diamine is XTJ-504 (formerly JEFFAMINE® EDR-148), which is also known as triethyleneglycoldiamine, having CAS Registry No. 929-59-9 and the chemical structure $H_2N$—$CH_2CH_2$—O—$CH_2CH_2$—O—$CH_2CH_2$—$NH_2$. In one embodiment, the polyetherdiamine has the structure $NH_2CH(CH_3)$ $CH_2O$—$(CH_2CHR'O)_x$—$CH_2CH(CH_3)NH_2$, where R and R' are methyl or H. Huntsman also sells triethyleneglycol diamine under their XTJ-504 diamine designation (formerly JEFFAMINE® EDR-148 diamine) having the structure $H_2N$—$CH_2CH_2$—O—$CH_2CH_2$—O—$CH_2CH_2$—$NH_2$, which may be used as the polyetherdiamine. Additional suitable polyetherdiamines from Huntsman are XTJ-511 having the structure $H_2N$—$C(CH_3)CH_2$—O—$CH_2CH_2$—O—$CH_2CH_2$—O—$CH_2C(CH_3)H$—$NH_2$; and XTJ-523 diamine having the structure $H_2H$—$C(CH_2CH_3)H$—$CH_2$—$(O$—$C(CH_2CH_3)H$—$CH_2)_a$—$OCH_2C(CH_2CH_3)$—$NH_2$ where a is ca. 26.

The foregoing diamines are exemplary of diamines of the formula $H_2N$—$R^2$—$NH_2$ as discussed further below.

Diamines are conveniently used to prepare cyclic bisamides of formula (I) wherein G is —NH—C(O)—R. However, in preparing cyclic bisamides of formula (I) wherein G is —C(O)—NH—R or —C(O)—$NR_2$, then diacids of formula (V) are conveniently employed as a starting material. As mentioned above, in one aspect of the invention, two different cyclic bisamides as defined herein, i.e., two different bisamides of structure (I), may be present in a blend of the present invention. For example, a cyclic bisamide of structure (II) and a bisamide of structure (III) may be present in the blend. As another example, two different cyclic bisamides of structure (II) may be present in the blend. As a further example, two different cyclic bisamides of structure (III) may be present in the blend. Each of these three examples is a separate aspect of the present invention.

For each of these three aspects, in one embodiment of the invention G, in each occurrence is —C(O)—NH—R or —C(O)—$NR_2$. Separately, for each of these three aspects, in one embodiment of the invention G, in each occurrence, is —C(O)—NH—R. Separately, for each of these three aspects, in one embodiment of the invention G, in each occurrence, is —C(O)—$NR_2$. The preparation of a blend meeting this criteria is conveniently accomplished by employing two different diacids. In one aspect of the invention, two different diacids are used to prepare the blend, where at least one diacid is described by structure (V). For example, both diacids may be described by structure (V). However, in a separate embodiment, one of the diacids is a cyclic diacid described by structure (V) and another diacid may or may not be cyclic, however, it is not described by structure (V). The diacid that is not described by structure (V) is referred to as the co-diacid.

Exemplary co-diacids include the following, where separate aspects of the invention provide that each of the listed exemplary co-diacids is used to prepare a blend of the present invention: co-diacids having a linear $C_{4-12}$ hydrocarbon group between the two carboxylic acid groups; co-diacids having a linear $C_{6-8}$ hydrocarbon group between two carboxylic acid groups; 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid), 1,11-undecanedoic acid, 1,12-dodecanedioic acid (1,10-decanedicarboxylic acid), 1,13-tridecanedioic acid (brassylic acid) and 1,14-tetradecanedioic acid (1,12-dodecanedicarboxylic acid).

Another exemplary co-diacid for use in the present invention is the reaction product of acrylic or methacrylic acid (or the ester thereof, with a subsequent hydrolysis step to form an acid) and an unsaturated fatty acid. For example, a $C_{21}$ diacid of this type may be formed by reacting acrylic acid with a $C_{18}$ unsaturated fatty acid (e.g., oleic acid), where an ene-reaction presumably occurs between the reactants. An exemplary $C_2$, diacid is commercially available from Westvaco Corporation, Chemical Division, Charleston Heights, S.C., as their product number 1550.

Aromatic diacids may be used as the co-diacid. An "aromatic diacid" as used herein refers to a molecule having two carboxylic acid groups (—COOH) or reactive equivalents thereof (e.g., acid chloride (—COCl) or ester (—COOR)) and at least one aromatic ring ("Ar"). Phthalic acids. e.g., isophthalic acid and terephthalic acid, are exemplary aromatic co-diacids. The aromatic co-diacid may contain aliphatic carbons bonded to the aromatic ring(s), as in HOOC—$CH_2$—Ar—$CH_2$—COOH and the like. The aromatic co-diacid may contain two aromatic rings, which may be joined together through one or more carbon bonds, (e.g., biphenyl with carboxylic acid substitution) or which may be fused (e.g., naphthalene with carboxylic acid substitution).

The foregoing co-diacids are exemplary of diacids of the formula HOOC—$R^4$—COOH as discussed later herein.

In one aspect of the invention, the blend has advantageous properties not observed with any of the component bisamides. For example, improvements in transparency, melt viscosity and melting point may be observed in the bisamide blend compared to the cyclic bisamide alone. Thus, in one aspect of the invention, the blend is more transparent, i.e., has greater transparency, than either of two component bisamides in neat form under identical testing conditions. In one embodiment of this aspect, the blend has a melting point within the ranges set forth above for the cyclic bisamide of the invention, e.g., in various embodiments the melting point of the blend is 50–175° C., preferably 80–150° C., and more preferably 100–130° C. In addition, the blend preferably has a viscosity of below 30 cPs when measured at 130° C.

F. Other Difunctional Reactants

In one aspect of the invention, diamine(s) and monoacid(s) are the only reactants present in a reaction mixture used to prepare a cyclic bisamide or blend as described herein. In another aspect, diacid(s) and monoamine(s) are the only reactants present in a reaction mixture used to prepare a cyclic bisamide or blend as described herein. However, in other aspects of the invention as described next, a reaction mixture may be utilized that contains more than these particular reactants.

In one aspect of the invention, a second difunctional reactant may be included among the reactants. The following description is provided for the case where the second difunctional reactant is a diacid. However, the invention also provides for the complementary situation, not described in such detail, where the second difunctional reactant is a diamine.

In one aspect where the bisamide is prepared from diamine(s) and mono(acids), a small amount of diacid(s) may be added to the reaction mixture. This diacid is the "second difunctional reactant" referred to above. The diacid serves to boost the average molecular weight of the resulting composition, with a concomitant and desirable increase in melting point. However, increasing the average molecular weight of the composition also typically has the effect of boosting the melt viscosity of the composition, and this is typically undesirable. Accordingly, in this instance where diacid is a reactant, the diacid is preferably present in a minor amount, on the order of less than 20% of the total weight of the reactants. Most often the desired effect achieved by diacid can be achieved when diacid contributes less than 18%, or less than 16%, or less than 14%, or less than 12%, or less than 10%, or less than 8%, or less than 6%, or less than 4%, or less than 2% of the total weight of the reactants, where these ranges are each separate embodiments of the present invention. In one aspect of the invention, diacid is not present at all.

Likewise, when the bisamide is prepared from diacids(s) and mono(amines), a small amount of diamine(s) may be added to the reaction mixture. This additional difunctional reactant, which is reactive with the difunctional reactant intended to form the bisamide, will cause an increase in the average molecular weight of the composition, typically with attendant increase in melting point and melt viscosity.

Accordingly, in the instance where diamine is a reactant, the diacid is preferably present in a minor amount, on the order of less than 20% of the total weight of the reactants. Most often the desired effect achieved by diacid can be achieved when diacid contributes less than 18%, or less than 16%, or less than 14%, or less than 12%, or less than 10%, or less than 8%, or less than 6%, or less than 4%, or less than 2% of the total weight of the reactants, where these ranges are each separate embodiments of the present invention. In one aspect of the invention, diacid is not present among the reactants at all. Instead of describing the presence of diacid in terms of weight percent based on the total weight of the reactants, the diacid may be described based on equivalents. Most often the desired effect achieved by diacid can be achieved when diacid contributes on the order of less than 20% of the carboxylic acid equivalents present in the reaction mixture, where monoacid will typically constitute the 80% or more of the acid equivalents. Most often the desired effect achieved by diacid can be achieved when diacid contributes less than 18%, or less than 16%, or less than 14%, or less than 12%, or less than 10%, or less than 8%, or less than 6%, or less than 4%, or less than 2% of the total carboxylic acid equivalents present in the reaction mixture, where these ranges are each separate embodiments of the present invention.

These compositions of the present invention that are prepared from a second difunctional reactant preferably have the properties that have been set forth above for the cyclic bisamides and blends thereof. For instance, in various embodiments of the invention, these compositions have a melting point of 50–175° C., or 60–175° C., or 70–175° C., or 80–175° C., or 90–175° C., or 100–175° C., or 50–150° C., or 60–150° C., or 70–150° C., or 80–150° C., or 90–150° C., or 100–150° C., or 50–130° C., or 60–130° C., or 70–130° C., or 80–130° C., or 90–130° C., or 100–130° C. Independently, these compositions may be characterized by their melt viscosity, where in various embodiments of the invention the melt viscosity of the compositions, when measured at 130° C., is less than 500 cPs, or less than 400 cPs, or less than 300 cPs, or less than 200 cPs, or less than 100 cPs, or less than 90 cPs, or less than 80 cPs, or less than 70 cPs, or less than 60 cPs, or less than 50 cPs, or less than 40 cPs, or less than 30 cPs, or less than 20 cPs. These compositions preferably have an appearance ranging from translucent to transparent, and in one aspect the compositions is crystal clear. However, black hot-melt inks are commercially desirable, so colored compositions, e.g., amber or hazy compositions are also useful. Also, the compositions are preferably non-tacky at room temperature or even slightly elevated temperatures as might be experienced when printed materials are transported in hot weather by truck or rail.

Thus, the present invention provides a composition prepared by the process of reacting, under amidification conditions, reactants comprising a diamine of structure (IV)

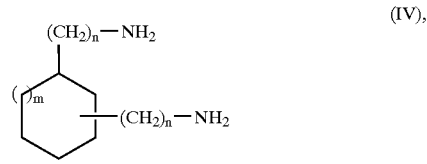

(IV), and a monocarboxylic acid of the formula $R^1$—COOH, wherein n is 0 or an integer from 1 to 10, m is 0 or 1 to provide a cyclopenty ring or cyclohexyl ring, and $R^1$ is a C1–C75 alkyl group. The reactants may further comprise a difunctional reactant selected from (a) $H_2N$—$R^2$—$NH_2$ where R is selected (i) from a polyether group having a plurality of $OR^3$ groups where $R^3$ is a C2–C10 aliphatic hydrocarbyl, and (ii) a C2–C36 hydrocarbyl group and (b) HOOC—$R^4$—COOH where $R^4$ is a C2–C34 hydrocarbyl group, where the composition has a melt viscosity at 130° C. of less than 100 cPs. In the case where the difunctional reactant is of the formula $H_2N$—$R^2$—$NH_2$, a blend of bisamides is prepared. In this case where the difunctional reactant is of the formula HOOC—$R^4$—COOH, a composition including cyclic bisamide and a minor amount of oligoamide is prepared.

In various optional embodiments, any one of the following criteria may be used to characterize the composition, or any two or more of the following criteria may jointly characterize the composition: the diamine of structure (IV) is 1,2-diaminocyclohexane; the reactants comprise HOOC—$R^4$—COOH, which represents dimer acid; the reactants comprise $H_2N$—$R^2$—$NH_2$ where $R^2$ is a polyether group having a plurality of $OR^3$ groups where $R^3$ is a C2–C3 aliphatic hydrocarbyl; the difunctional reactant of formula $H_2N$—$R^2$—$NH_2$ has a formula weight of less than 3,000 g/mol; the reactants comprise $H_2N$—$R^2$—$NH_2$ where $R^2$ is a C2–C36 hydrocarbyl group; the reactants comprise H$_2$N—R$^2$—NH$_2$, and H$_2$N—R$^2$—NH$_2$ represents a second cyclic diamine of structure (IV)

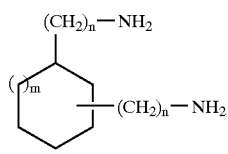
(IV), wherein n is 0 or an integer from 1 to 10, m is 0 or 1 to provide a cyclopenty ring or cyclohexyl ring, and R$^1$ is a C1–C75 alkyl group; the reactants comprise both a difunctional reactant of formula H$_2$N—R$^2$—NH$_2$ where R$^2$ is selected (i) from a polyether group having a plurality of OR$^3$ groups where R$^3$ is a C2–C10 aliphatic hydrocarbyl, and (ii) a C2–C36 hydrocarbyl group, and a difunctional reactant of formula HOOC—R$^4$—COOH where R$^4$ is a C2–C34 hydrocarbyl group; the difunctional reactant of formula H$_2$N—R$^2$—NH$_2$ represents a second cyclic diamine of structure (IV)

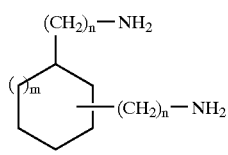
(IV), where optionally the difunctional reactant of formula HOOC—R$^4$—COOH represents dimer acid; the difunctional reactant comprises carboxylic acid groups, and the carboxylic acid groups from the difunctional reactant constitute less than 25 equivalent percent of the total of the carboxylic acid groups present in the reactants; the difunctional reactant comprises amine groups, and the amine groups from the difunctional reactant constitute less than 25 equivalent percent of the total of the amine groups present in the reactants; the composition has a clarity that is greater than the corresponding composition prepared without the difunctional reactant(s), i.e., the composition having the difunctional reactant is more transparent than is the corresponding composition prepared without the difunctional reactant, assuming the equivalents of second difunctional reactant are replaced with additional equivalents of the same functional group that are present on reactants already in the reaction mixture.

G. Preparation of Inks with Cyclic Bisamides or Blends

The foregoing has described compositions containing cyclic bisamides, including blends and compositions with slightly increased molecular weights (prepared by using multiple difunctional reactants). These materials may be used to prepare inks for hot melt printing.

Hot-melt ink compositions of the present invention may generally be prepared simply by combining the desired ingredients to form a mixture, and heating the mixture with stirring to form a molten homogeneous composition that is the hot-melt ink composition. A temperature in the range of about 90° C. to about 150° C. is typically adequate to achieve a homogeneous composition after a stirring time of about 15 minutes to about 1 hour. It is also possible to melt one component of the ink, e.g., the cyclic bisamide, and then add other components with stirring. When pigment is included in the hot-melt ink composition, then it may be necessary to grind the mixture of ingredients to effect a uniform dispersion of the pigment in the ink. Grinding may suitably be accomplished with a ball mill or an atritor.

As used herein, the terms "hot-melt ink" and "phase-change ink" denote ink that is a solid at room temperature and a liquid at the operating temperature of the printer employing the hot-melt ink. Typical printers for hot-melt inks heat the ink to about 110° C. to about 130° C. The hot-melt ink of the invention thus has a viscosity of about 1 centipoise (cP) to about 50 cP at a temperature of about 75° C. to about 175° C., more preferably has a viscosity of about 2 cP to about 20 cP at a temperature of about 90° C. to about 150° C., and still more preferably has a viscosity of about 5 cP to about 15 cP at a temperature of about 110° C. to about 130° C. In a preferred embodiment, the ink composition includes a cyclic bisamide as described above that is free of solvent having a boiling point of less than 150° C.

H. Printing with Inks Containing Cyclic Bisamides

The hot-melt ink of the invention may be used to print on a wide variety of substrates, which may be porous or non-porous. Exemplary substrates include plastics, plastic laminates, glass, metal, paper, wood, etc. The ink may be used in drop-on-demand and continuous ink jet printers, where these printers are commercially available from many sources.

Thus, in one aspect, the invention provides a method of printing which includes the step of contacting a substrate with an ink, where the ink includes an image-forming component and cyclic bisamide as defined above, including the various aspects and embodiments thereof. The contacting step may be achieved by, for example, jetting the ink from a reservoir to a substrate, where suitable substrates are paper and polyester. In one aspect, the ink has a viscosity of less than 150 cP when measured at 130° C.

The phase-change ink may also be used in gravure and intaglio printing. To achieve such printing with phase-change ink, phase-change ink as described above is melted and the molten ink stored in a reservoir. A printing plate, which is typically warmed to a temperature of greater than or about the same as the melting point of the phase-change ink, is then contacted with the pool of molten phase-change ink. In this way, molten phase-change ink is transferred to a gravure or intaglio printing plate, in essentially the same manner as liquid inks are currently transferred to a printing plate.

The printing plate, having molten phase-change ink thereon, is then contacted with a substrate in order to transfer ink to the substrate in an image-wise fashion. The substrate, which is typically at room temperature, will immediately induce cooling of the phase-change ink, and thereby cause the ink to become fixed to the substrate.

Thus, the present invention provides a method of printing wherein a hot melt ink comprising a cyclic bisamide is rendered in molten form, e.g., by melting off a thermal ink ribbon or conducted from a reservoir, and then ejected onto a substrate. Hot melt printing with inks other than those of the present invention is known in that art, and those printing techniques may be used to achieve printing with the compositions of the present invention.

The cyclic bisamides of the present invention may also be used in rapid prototyping. Rapid prototyping is a common name given to a family of technologies that may be used to fabricate physical objects directly from CAD data sources. Such systems are also known by the general names freeform fabrication (FFF), solid freeform fabrication (SFF) and layered manufacturing. Common methods for rapid prototyping include stereolithography, wide area inkjet, selective laser sintering, fused deposition modeling (FDM), single jet inkjet, three dimensional printing (3DP), and laminated object manufacture. Several of these methods (e.g., inkjet methods, fused deposition modeling, 3DP) form the objects by creating layer on top of layer of a substance.

For example, in FDM, a thermoplastic filament is unwound from a coil and supplies material to an extrusion nozzle. The nozzle is heated to melt the plastic and has a mechanism which allows the flow of the melted plastic to be turned on and off. The nozzle is mounted to a mechanical stage which can be moved in both horizontal and vertical directions. As the nozzle is moved over the table in the required geometry, it deposits a thin bead of molten thermoplastic to form each layer. The plastic hardens immediately after being squirted from the nozzle and bonds to the layer below. The entire system is contained within a chamber which is held at a temperature just below the melting point of the plastic. The cyclic bisamides of the present invention may be used in FDM. FDM devices are available from Stratasys (www.stratasys) of Minneapolis, Minn.

Inkjet technology has also been used in rapid prototyping. One type of inkjet rapid prototyping employs a machine with two jets: one jets provides a thermoplastic build material and the other jet provides a was-like support material (to fill in and support openings during manufacturing of the part). Each of the support material and build material are held in a molten state in reservoirs, and are dispensed as tiny droplets as the printing head moves in an X-Y fashion. Each of the materials rapidly hardens after they leave the print head and reach room temperature. After the object has been created, the support material is either melted or dissolved away. The cyclic bisamides of the present invention may be used as the build or the support material. Z Corporation (www.zcorp.com) of Burlington Mass. markets several devices and materials for inkjet and three dimensional printing rapid prototyping.

The ease with which the cyclic bisamides of the present invention may be formed into a low viscosity molten form enables them to be readily ejected from a printhead or other dispenser, whereupon they rapidly solidify as they cool to ambient temperature. These properties of the bisamides of the present invention allow them to be very useful in rapid prototyping.

The following examples are set forth as a means of illustrating the present invention and are not to be construed as a limitation thereon.

EXAMPLES

Example 1

Tetradecanoic acid (myristic acid, 60.0 g, 261 meq.) and cis/trans-1,2-diaminocyclohexane (DACH, 15.0 g, 263 meq., both chemicals from Aldrich Chemical Co.) were charged to a 250 mL flask equipped with a magnetic stir bar, nitrogen purge, and thermocouple thermometer and heated gradually to 220° C. and held at this temperature for about six hours to obtain 1,2-dicyclohexylene bismyristamide, a translucent, hard, waxy, brittle compound melting at 134.5° C. and having an acid value of 3.6, an amine value of 3.8 and a molten viscosity value at 140° C. of 12.3 cPs.

Example 2

Hexadecanoic acid (palmitic acid, 66.1 g, 257 meq., Aldrich) and cis/trans-2-aminomethyl-1-cyclopentylamine (AMCPA, 13.4 g, 225 meq., DuPont) were charged to a 250 mL flask equipped with a magnetic stir bar, nitrogen purge, and thermocouple thermometer and heated gradually to 220° C. and held at this temperature for about eight hours to obtain the cyclopentyl bispalmitamide, a translucent, hard, waxy, brittle material melting at 108.1° C. and having an acid value of 13.0, an amine value of 18.4 and a molten viscosity value at 130° C. of 21.3 cPs.

Example 3

The procedure of Examples 1 and 2 was followed using a reactor charge of dodecanoic acid (lauric acid, 70.5 g, 352 meq., Aldrich), EMPOL 1008® dimer acid (20.7 g, 72 meq., Cognis, Cincinnati, Ohio, USA), and DACH (24.3 g, 426 meq., Aldrich) to obtain a bisamide (major product)—oligoamide (minor product) mixture that was transparent, hard, and brittle, melting at 127.9° C. and having an acid value of 4.4, an amine value of 5.2 and a molten viscosity value at 130° C. of 47.1 cPs.

Example 4

The procedure of Examples 1 and 2 was followed using a reactor charge of lauric acid (38.0 g, 190 meq.), palmitic acid (56.9 g, 222 meq.), PRIPOL 1009® dimer acid (10.7 g, 37 meq., Uniqema, New Castle, Del., USA), DACH (15.3 g, 206 meq.) and AMCPA (15.2 g, 252 meq., DuPont, Wilmington, Del., USA) to obtain a bisamide (major product)—oligoamide (minor product) mixture that was transparent, hard, and brittle, melting at 116.6° C. and having an acid value of 20.6, an amine value of 13.3 and a molten viscosity value at 130° C. of 26.7 cPs.

Example 5

The procedure of Examples 1 and 2 was followed using a reactor charge of myristic acid (142.7 g, 403 meq.), PRIPOL 1009® dimer acid (20.2 g, 70 meq.), DACH (23.0 g, 403 meq.) and XTJ-504 (22.4 g, 302 meq., Huntsman Chemicals, Houston, Tex., USA) to obtain a bisamide (major product)—oligoamide (minor product) mixture that was transparent, slightly hazy, hard, slippery, and brittle, melting at 113.3° C. and having an acid value of 4.5, an amine value of 5.2 and a molten viscosity value at 130° C. of 16.5 cPs.

Example 6

To a 1 L 4-necked round-bottomed flask equipped with a thermocouple, overhead stirrer, nitrogen inlet and water-takeoff/condenser was charged 285.06 g (acid equivalents) myristic acid (Aldrich, 95% purity), 70.02 g undecylenic acid (Atofina Chemicals Inc., 97% purity), 47.23 g PRIPOL 1009® dimer acid (Uniqema), and 1.1.6 g 25% aqueous hypophosphorous acid as catalyst and bleaching agent. The reactor contents were heated under a blanket of nitrogen and with stirring to 100° C. at which point a mixture of amines was added over 10 minutes, consisting of 84.16 g of 1,2-diaminocyclohexane (Aldrich, 99% purity, mixture of cis- and trans-isomers) and 21.00 g XTJ-504 (Huntsman).

The reaction mixture was then heated to 200° C. while allowing the water of reaction to distill. After 2 hours at this temperature, a sample was removed to measure the acid and amine numbers (18.3, 8.5 respectively) and the spread adjusted by the addition of 2.42 g of 1,2-diaminocyclohexane. The reaction temperature was then raised to 220° C. After a total of 9 h reaction, vacuum (ca. 50 mbar) was applied to the reaction mixture for 5 h. The product was then poured. The resin is a hard, essentially transparent solid with an acid number of 4.8 and an amine number of 4.0 and having a melting point of 123° C. and a melt viscosity of 21.0 cP (130° C.).

All publications and patent applications mentioned in this specification are herein incorporated by reference to the same extent as if each individual publication or patent application was specifically and individually incorporated by reference.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A non-aqueous composition comprising an image-forming material and a cyclic bisamide of formula (I)

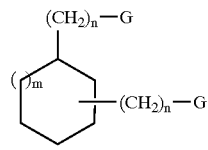

(I)

wherein n is 0 or an integer from 1 to 10, m is 0 or 1 to provide a cyclopenty ring or cyclohexyl ring, respectively, and G is an amide-containing group.

2. The composition of claim 1 having a viscosity at 130° C. of less than 100 cPs.

3. The composition of claim 1 having a melting point of 100–130° C.

4. The composition of claim 1 having an acid number of 0.1–10 and an amine number of 0.1–10.

5. The composition of claim 1 wherein the cyclic bisamide constitutes at least 10 wt % of the composition.

6. The composition of claim 1 wherein the image-forming material is a pigment or a dye.

7. The composition of claim 1 wherein G is —NH—C(O)—R and R is a C1–C75 alkyl group independently selected at each occurrence.

8. The composition of claim 1 wherein the cyclic bisamide is described by formula (IIIa)

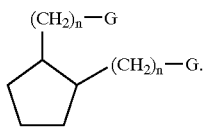

(IIIa)

9. The composition of claim 8 wherein n is zero at each occurrence, G is —NH—C(O)—R at each occurrence, and R is a C8–C22 alkyl group independently selected at each occurrence.

10. The composition of claim 1 wherein the cyclic bisamide is described by formula (IIa)

(IIa)

11. The composition of claim 10 wherein n is zero at one occurrence, n is 1 at one occurrence, G is —NH—C(O)—R at each occurrence, and R is a C8–C22 alkyl group independently selected at each occurrence.

12. The composition of claim 1 comprising a second bisamide compound, where the second bisamide compound is not described by formula (I).

13. The composition of claim 12 wherein the second bisamide compound comprises a polyether moiety located between two amide groups.

* * * * *